(12) United States Patent
Thacker

(10) Patent No.: US 11,896,908 B1
(45) Date of Patent: Feb. 13, 2024

(54) SYSTEMS AND METHODS FOR COMBINING PERMANENT REGISTRY INFORMATION AND IN-GAME ACTIVITY INFORMATION TO DETERMINE RELEASE LOGISTICS

(71) Applicant: Mythical, Inc., Sherman Oaks, CA (US)

(72) Inventor: Cameron Thacker, Sherman Oaks, CA (US)

(73) Assignee: Mythical, Inc., Sherman Oaks, CA (US)

( * ) Notice: Subject to any disclaimer, the term of this patent is extended or adjusted under 35 U.S.C. 154(b) by 0 days.

(21) Appl. No.: 17/458,176

(22) Filed: Aug. 26, 2021

(51) Int. Cl.
 *A63F 13/00* (2014.01)
 *A63F 13/79* (2014.01)
 *A63F 13/35* (2014.01)

(52) U.S. Cl.
 CPC .............. *A63F 13/79* (2014.09); *A63F 13/35* (2014.09)

(58) Field of Classification Search
 CPC ............ G07F 17/3244; G07F 17/3239; G07F 17/326; G07F 17/3225; G07F 17/34; G07F 17/3267
 See application file for complete search history.

(56) References Cited

U.S. PATENT DOCUMENTS

| | | |
|---|---|---|
| 8,417,715 B1 | 4/2013 | Bruckhaus |
| 8,469,801 B2 | 6/2013 | Ocko |
| 10,286,324 B1 | 5/2019 | McLellan |
| 11,170,352 B2 | 11/2021 | Hiroaki |
| 11,207,604 B1 | 12/2021 | Koch |
| 11,383,168 B1 | 7/2022 | Thacker |
| 2009/0117996 A1 | 5/2009 | Death |
| 2010/0121729 A1 | 5/2010 | Betzler |
| 2011/0055733 A1 | 3/2011 | Hamilton, II |
| 2011/0295649 A1 | 12/2011 | Fine |
| 2014/0128153 A1 | 5/2014 | Driemeyer |
| 2014/0206452 A1 | 7/2014 | Bambino |
| 2014/0335963 A1 | 11/2014 | Wolters |
| 2015/0163311 A1 | 6/2015 | Heath |
| 2016/0203509 A1 | 7/2016 | Sharp, III |
| 2018/0247191 A1* | 8/2018 | Katz ................... G07F 17/3225 |
| 2018/0341861 A1* | 11/2018 | Katz ..................... G06V 40/16 |
| 2018/0361253 A1 | 12/2018 | Grosso |
| 2018/0373983 A1* | 12/2018 | Katz ................... G07F 17/3237 |

(Continued)

*Primary Examiner* — David L Lewis
*Assistant Examiner* — Eric M Thomas
(74) *Attorney, Agent, or Firm* — Esplin & Associates, PC

(57) ABSTRACT

Systems and methods to combine permanent registry information and in-game activity information to determine release logistics, based on information recorded on permanent registries, are disclosed. Exemplary implementations may execute instances of a game; manage player accounts associated with the players; monitor a first set of in-game action instructions for a first set of in-game actions by the players; determine values for in-game action metrics based on the monitored first set of in-game action instructions; monitor recorded information on one or more permanent registries; determine values for registry metrics based on the monitored recorded information; determine one or more release parameters based on a combination of at least one value of an in-game action metric and at least one value of a registry metric.

20 Claims, 5 Drawing Sheets

(56) References Cited

U.S. PATENT DOCUMENTS

| | | |
|---|---|---|
| 2019/0180329 A1 | 6/2019 | Chetlur |
| 2019/0303960 A1 | 10/2019 | Walsh |
| 2020/0122021 A1 | 4/2020 | Gordon |
| 2020/0126112 A1 | 4/2020 | Leonard |
| 2020/0202668 A1 | 6/2020 | Cotta |
| 2020/0258061 A1 | 8/2020 | Beadles |
| 2020/0320644 A1 | 10/2020 | Hollis |
| 2020/0327449 A1 | 10/2020 | Tiwari |
| 2020/0357246 A1 | 11/2020 | Nelson |
| 2021/0019987 A1 | 1/2021 | Cohen |
| 2021/0042590 A1 | 2/2021 | Watts |
| 2021/0065505 A1 | 3/2021 | Rousseau |
| 2021/0118085 A1 | 4/2021 | Bushnell |
| 2022/0152491 A1 | 5/2022 | Hall |
| 2022/0198562 A1 | 6/2022 | Cella |

\* cited by examiner

US 11,896,908 B1

SYSTEMS AND METHODS FOR COMBINING PERMANENT REGISTRY INFORMATION AND IN-GAME ACTIVITY INFORMATION TO DETERMINE RELEASE LOGISTICS

FIELD OF THE DISCLOSURE

The present disclosure relates to systems and methods for combining permanent registry information and in-game activity information to determine release logistics.

BACKGROUND

Online gaming platforms are known. Distributed registries are known techniques to produce a secure record or registry of rights pertaining to assets or articles, transactions, and other information. Many types of digital articles are known.

SUMMARY

One aspect of the present disclosure relates to a system configured to combine permanent registry information and in-game activity information to determine release logistics, based (at least in part) on information recorded on permanent registries. The system may include the online gaming platform, a registry server, and/or other components. The online gaming platform and/or the registry server may include one or more (hardware) processors configured by machine-readable instructions to execute instances of a game; manage player accounts associated with the players; monitor in-game action instructions for in-game actions by the players; determine values for in-game action metrics; monitor recorded information on permanent registries; determine values for registry metrics; determine one or more release parameters based on a combination of at least one value of an in-game action metric and at least one value of a registry metric; and/or recommend or take actions based on the one or more release parameters.

Another aspect of the present disclosure related to a method of combining permanent registry information and in-game activity information to determine release logistics, based (at least in part) on information recorded on permanent registries. The method may include executing instances of a game; managing player accounts associated with the players; monitoring in-game action instructions for in-game actions by the players; determining values for in-game action metrics; monitoring recorded information on permanent registries; determining values for registry metrics; determining one or more release parameters based on a combination of at least one value of an in-game action metric and at least one value of a registry metric; and/or recommending or taking actions based on the one or more release parameters.

As used herein, any association (or relation, or reflection, or indication, or correspondency, or correlation) involving servers, processors, client computing platforms, players, player accounts, inventories, articles, digital articles, requests, responses, transactions, in-game actions, awards, permanent registries, metrics, metric values, scores, sets of instructions, operations, determinations, distributions, transfers, presentations, interfaces, notifications, and/or another entity or object that interacts with any part of the system and/or plays a part in the operation of the system, may be a one-to-one association, a one-to-many association, a many-to-one association, and/or a many-to-many association or "N"-to-"M" association (note that "N" and "M" may be different numbers greater than 1).

As used herein, the term "obtain" (and derivatives thereof) may include active and/or passive retrieval, determination, derivation, transfer, upload, download, submission, and/or exchange of information, and/or any combination thereof. As used herein, the term "effectuate" (and derivatives thereof) may include active and/or passive causation of any effect, both local and remote. As used herein, the term "determine" (and derivatives thereof) may include measure, calculate, compute, estimate, approximate, generate, and/or otherwise derive, and/or any combination thereof.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
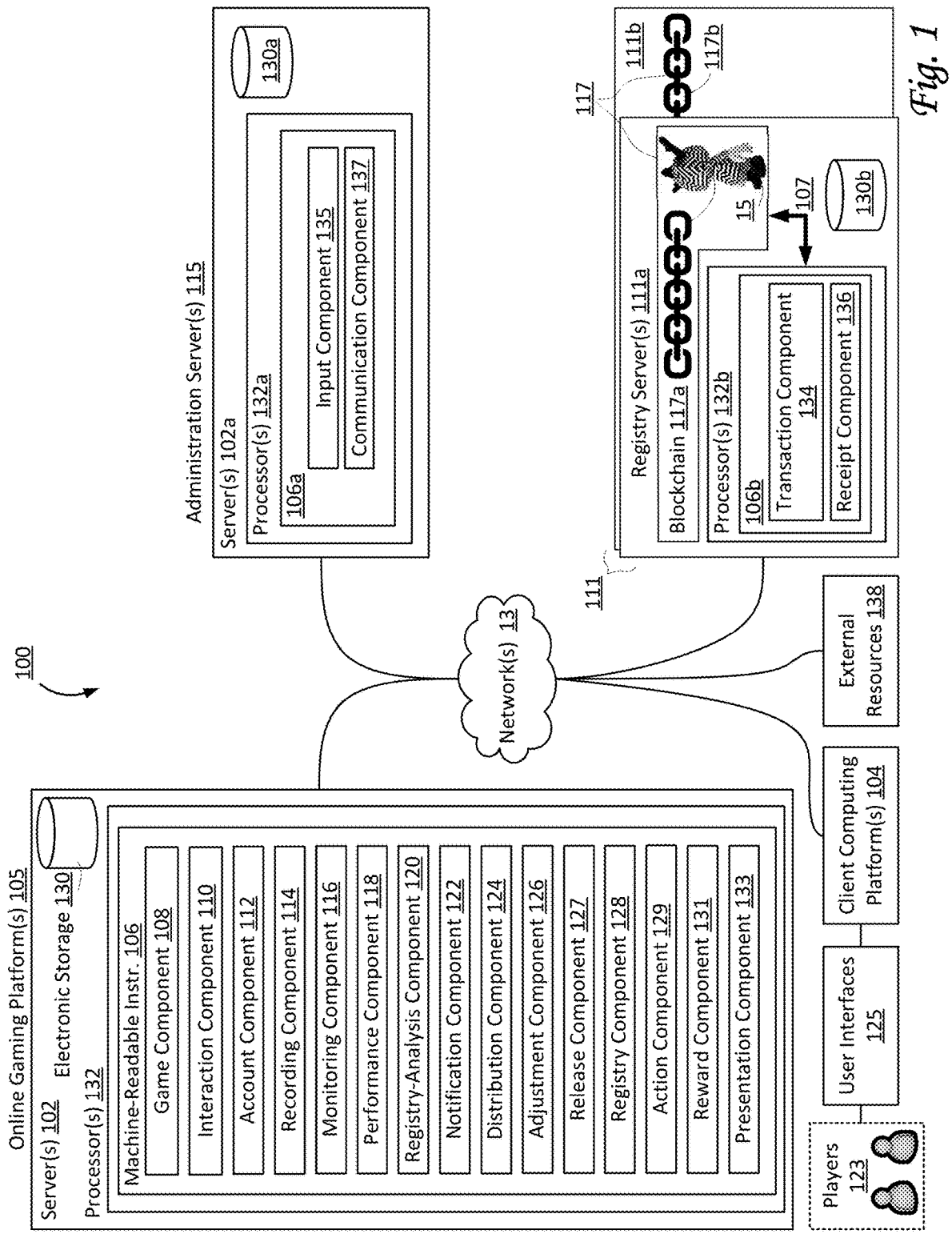
FIG. 1 illustrates a system configured to combine permanent registry information and in-game activity information to determine release logistics, in accordance with one or more implementations.

FIG. 1 illustrates a system 100 configured to combine permanent registry information and in-game activity information to determine release logistics, in accordance with one or more implementations. As used herein, the term "release" may refer to making a set of unique digital articles available to players of an online gaming platform 105, e.g., through a store, marketplace, auction, lottery, drop, or other type of distribution. In some implementations, the particular set of unique digital articles for a particular release has not previously been available to the players (e.g., through the store, etc.). As used herein, the term "release logistics" may refer to one or more release parameters for the release of a set of unique digital articles. For example, a particular release may be controlled and/or otherwise conducted in accordance with one or more of the determined release parameters. By way of non-limiting example, release parameters may include one or more of the number of unique digital articles being released, the number of different types of unique digital articles being released, the price per unique digital article, how long the sale and/or release will be open (e.g., for a limited time, or indefinitely until the supply is exhausted), what will happen to unsold items of a release (e.g., burn or save for a later sale, etc.), how the release will be announced (e.g., through which communication channels), to which users (or which classes/groups of users) the announcements of a release will be communicated, how long in advance of the opening of a release the announcements of the release will be communicated, whether to include a requirement that users register to be eligible to participate in a release, whether to include requirements about which (groups and/or classes of) users will be eligible to participate in a release (e.g., new users only, or experienced collectors only, etc.), what time of day to open a release, what day of the week or month to open a release, how long to wait after the most recent previous release, how many releases to plan in a predetermined period of a month (or two months, or three months), and/or other release parameters.

As a preliminary and non-limiting example, by virtue of the systems and methods described in this disclosure, in-game activity by players may be monitored, analyzed, and/or otherwise used to determine values for in-game action metrics (e.g., for a set or group of players). Ownership information for the players (as recorded on one or more permanent registries 117) may be monitored, analyzed, and/or otherwise used to determine values for registry metrics (e.g., for a set or group of players). By virtue of the systems and methods described in this disclosure, one or more release parameters for a particular release of a particular set of unique digital articles may be determined, and subsequently used. The determination of the one or more release parameters may be based on a combination of at least one of the one or more values for in-game action metrics and at least one of the one or more values for registry metrics. In some implementations, the release parameters of a future release may include an expected amount of sales.

As used herein, the term "unique digital article" may refer to digital articles that are uniquely identified and/or uniquely identifiable, e.g., by an identifier or by identifying information. For example, in some implementations, an identifier or identifying information may include or be based on a combination of different types of information, including but not limited to information regarding the type of a digital article, a serial number and/or other numerical identifier of the digital article, and/or other types of information. As used herein, rights pertaining to unique digital articles may be monitored, tracked, recorded, and/or otherwise registered on one or more permanent registries 117. As such, a unique digital article may be a registry-tracked unique digital article. In some cases, these rights may include ownership.

Individual unique digital articles may be associated and/or correlated with another entity (which may be referred to as a "correlated entity") by virtue of technology provided and/or supported by one or more permanent registries 117 on which rights pertaining to the individual unique digital articles are tracked (including but not limited to smart contracts and/or other executable code on one or more permanent registries 117). Accordingly, rights pertaining to a unique digital article may provide one or more rights (e.g., accessibility, control, ownership, etc.) with respect to the correlated entity. Transactions involving a unique digital article recorded on a permanent registry may correlate to certain transactions (or modifications) of the correlated entity, and/or vice versa.

In some implementations, correlated entities may be (or include) virtual items configured to be used within online-gaming platform 105 (such as, for example, a player-controllable in-game virtual character that is usable within an instance of a game within online gaming platform 105). Other types and/or combinations of correlated entities are envisioned within the scope of this disclosure, including but not limited to physical and/or virtual objects, items, rights, memberships, grants, etc. The use of the singular "entity" or "correlated entity" is not intended to be limiting, as multiple different objects, items, rights, memberships, grants, etc. may be correlated to a single unique digital article. By way of non-limiting example, a correlated entity may be an art work, a ticket to an event, a subscription to certain media content, a bundle of rights related to captured audio and/or video information, ownership of or accessibility to distribution gains, and so forth. As used herein, the term "non-fungible token" or "NFT" may be used to refer to a combination of a particular unique digital article and a particular correlated entity that is correlated to the particular unique digital article.

System 100 may include one or more online gaming platforms 105, registry server(s) 111, administration server(s) 115, client computing platform(s) 104, user interface(s) 125, server(s) 102, external resource(s) 138, and/or other components. Players 123 (also referred to as users) may include one or more of a first player, a second player, a third player, a fourth player, an administrative user, and/or other players. Players 123 may include players who play and/or otherwise interact on online gaming platform 105. As used in descriptions herein, any use of the term "player" may refer to player(s) 123, unless indicated otherwise. Electronic storage 130a and electronic storage 130b may be similar to electronic storage 130 as described elsewhere in this disclosure, though included in administration servers 115 and registry servers 111, respectively, as depicted in FIG. 1.

Instances of games may be executed within one or more online gaming platforms 105. As used herein, online gaming platform(s) 105 may refer to either an individual game (e.g., an interactive online game), a type of gaming console and its ecosystem, and/or both. Online gaming platform 105 may be configured to host (and/or execute instances of) the one or more (online) games. Online gaming platform 105 may be operated, hosted, and/or owned by one or more stakeholders of online gaming platform 105. For example, a platform operator (and/or another stakeholder) may sell in-game digital items (e.g., characters, weapons, resources, etc.) to players 123 of online gaming platform 105.

Referring to the game and to online gaming platform 105, in some implementations, individual players may own and/or control individual unique digital articles, correlated entities, and/or other virtual items, and exchange these with (or to) other individual players. As used herein, exchanges refer to individual players winning, losing, auctioning, selling, purchasing, trading, bartering, wagering, staking, and/or otherwise exchanging virtual items (directly, without a store or store interface under control of online gaming platform 105) to other individual players or with other individual players (including exchanging virtual items through player-to-player challenges). Due to an exchange, ownership rights of a digital article may transition from an original owner to a new owner (even if there may, in some implementations, be one or more intermediary and/or temporary owners during the process of performing the exchange). In some implementations, unique digital articles may be associated and/or correlated with other rights than ownership rights, such as, by way of non-limiting example, distribution rights.

In some implementations, distribution rights of (unique) digital articles may reflect rights held by the individual ones of the players 123 to receive certain distributions of awards upon exchanges involving the particular digital articles. For example, individual players 123 may own rights related to particular digital articles that guarantee them awards upon (future) exchanges involving those digital articles regardless of whether the individual players 123 own those digital articles (at the time of the particular exchange). In some implementations, the distribution gains may result from a particular action or activity (such as, e.g., a sale of a particular digital article), e.g., within the online gaming platform 105, of a particular digital article. As used herein, a distribution gain resulting from a particular action or activity may include one or more of a portion of the proceeds of the particular action or activity, a fee related to the particular action or activity, a minimum payment triggered by the occurrence of the particular action or activity (or a set of particular actions or activities), and/or another arrangement for payment and/or compensation, including but not limited to combinations of fixed fees, minimum fees, percentages of sales, percentages of profits, and/or other arrangements. The term "portion" does not imply or require a percentage or ratio, but rather is intended to signify that beneficiaries (i.e., the players that hold the distribution rights) may receive something of value and/or use. The distribution gains may include one or more virtual currencies such as virtual tokens, virtual stars, virtual points, virtual real-world currencies (e.g., US Dollars), and/or other gains that are based on the particular digital articles.

In some implementations, (unique) digital articles, correlated entities, and/or other virtual items may include and/or be virtual items that are not fungible and may be usable within online gaming platform 105. In some implementations, these may represent (three-dimensional) in-game player-controllable characters that can interact with other (in-game) virtual items within online gaming platform 105. In some implementations, virtual items may include one or more of weapons, toys, characters, abilities, skills, tools, pets, clothing, vehicles, game levels, missions, assignments, chapters, tasks, mini-games, restricted areas within a virtual space, restricted modes of gameplay, access rights within an online game, and/or other virtual items. In some implementations, virtual items may refer to any item or object within online gaming platform 105 for which a player may use, own, sell, trade, destroy, and/or otherwise effectuate a change of ownership or control.

As used herein, a digital article may be fungible if it is functionally and/or physically indistinguishable from another digital article. For example, a payment token such as a Bitcoin is fungible. A digital article may be non-fungible if it is unique, or one-of-a-kind. For example, a specific individual CryptoKitty™ may be non-fungible. A digital article may be semi-fungible if there is a set of a limited number of similar but distinguishable digital articles. For example, a limited-edition Blanko™ or another in-game character may be semi-fungible. For example, one of a limited number of 2-dimensional or 3-dimensional virtual items may be semi-fungible. For example, a digital ticket to a show, concert, exhibition, and/or other event may be semi-fungible. For example, a piece of art or jewelry (e.g., as a virtual item or as representing a physical item) may be semi-fungible. As used herein, semi-fungible digital articles are considered as unique, "not fungible", or non-fungible digital articles. In some implementations, digital articles may be usable within one or more games, e.g., on online gaming platform 105.

Registry server(s) 111 (e.g., registry server 111a, registry server 111b, and so forth) may be used to implement one or more permanent registries 117, including but not limited to blockchain 117a, blockchain 117b (partially visible in FIG. 1), and so forth. In some implementations, one or more permanent registries 117 may be decentralized and/or immutable registries (i.e., such a registry is append-only since previously added records are immutable). In some implementations, blockchain 117a and blockchain 117b may be maintained by distributed computing platforms (not shown in FIG. 1). In some implementations, a distributed computing platform may be implemented by a set of client computing platforms and/or servers (including, for example, one or more registry servers 111). The distributed computing platform may support a virtual machine (not shown in FIG. 1). The distributed computing platform and/or the virtual machine may form a runtime environment for smart contracts and/or other executable code. A distributed computing platform may include electronic storage configured to store part or all of blockchain 117a. For example, the smart contracts may be stored on blockchain 117a, blockchain 117b, and/or another permanent registry. In some implementations, the distributed computing platform may be the EOSIO platform. In some implementations, the distributed computing platform may be similar to or based on the EOSIO platform. In some implementations, the distributed computing platform may be Ethereum. In some implementations, the distributed computing platform may be similar to or based on Ethereum. In some implementations, the virtual machine may be a distributed and/or decentralized virtual machine.

In some implementations, at least one of permanent registries 117 implemented by registry servers 111 is a private permissioned permanent registry (e.g., a private permissioned blockchain). The private permissioned permanent registry may be configured to record information. The recorded information may include information pertaining to unique digital articles that are associated and/or correlated with in-game player-controllable characters that are configured to be used in an instance of a game. The recorded information may include rights pertaining to the unique digital articles. Implementing the in-game actions in the instance of the game may include, for at least some of the in-game actions implemented in the instance of the game, effectuating modifications to the recorded information pertaining to the unique digital article. For example, ownership rights and/or other accessibility may be modified. In some implementations, a private permissioned permanent registry may be specific to a particular online gaming platform 105 and/or a particular (gaming-related) ecosystem. In some implementations, a unique digital article may be removed from one permanent registry and added or recorded on another permanent registry. In some implementations, at least one of permanent registries 117 implemented by registry servers 111 is a public permanent registry (e.g., a public blockchain). The public permanent registry may be configured to be part of either EOSIO mainnet, Ethereum mainnet, Ethereum 1.5, Ethereum 2.0, a derivative of Ethereum 2.0 that is configured to perform transactions of Ether (ETH)

between accounts, or a derivative of EOSIO that is configured to perform transactions of EOS between different accounts.

Elements of blockchain 117a or another permanent registry may be grouped together in units that are referred to as blocks. For example, an individual block may include one or more digital articles (or digital assets) and one or more transactions. For example, an individual block may be linked to one or more other individual blocks. Individual blocks may be linked or chained together to form a structure of blocks and/or a hierarchy of blocks, such as, e.g., a chain of blocks. An individual block may include one or more digital articles, one or more transactions, smart contracts, and/or other information.

In some implementations, one or more permanent registries 117 implemented by registry servers 111 may be publicly accessible. In some implementations, one or more permanent registries 117 implemented by registry servers 111 may be private and/or permissioned. In some implementations, one or more permanent registries 117 implemented by registry servers 111 may be append-only (such that existing blocks are immutable once they have been added to the registry, and modifications are made by newly-added transactions). In some implementations, existing blocks of one or more permanent registries 117 implemented by registry servers 111 can substantially not be altered or deleted, unless multiple copies are altered. This is unlikely to happen provided that the multiple copies are stored on different computing platforms, e.g., in different geographical locations. Permanent registries 117 may be replicated on multiple computing platforms, preferably in multiple different geographical locations. Additionally, individual blocks may be linked together in a manner that prevents tampering, such as, e.g., using a hash chain and/or digital signatures. In particular, hash values may be generated using fixed-output-length one-way hashing functions that take variable-length input, and may be effectively impossible (or, at least, computationally infeasible) to reverse. As such, a hashing function may provide one-way encryption. By way of non-limiting example, the hashing function may be SHA-256, BLAKE2, SHAKE256, and/or another hashing function. Contents of individual blocks, transactions, and/or articles may be digitally signed in a manner that proves integrity and/or prevents tampering, e.g., by providing authentication, as well as non-repudiation.

As depicted in FIG. 1, registry server 111a may include one or more of electronic storage 130b, processor(s) 132b, machine-readable instructions 106b, (node of) blockchain 117a, and/or other components. Machine-readable instructions 106b may include one or more instruction components. The instruction components may include computer program components. The instruction components may include one or more of a transaction component 134, a receipt component 136, and/or other instruction components. In some implementations, an individual registry server may be dedicated to a particular node of a permanent registry. Typically, different nodes are included in (or implemented by, or hosted by) different servers or different computer systems to increase the safety and security of transactions on a blockchain. The consensus protocol used for a particular blockchain will be harder to falsify or circumvent when the different nodes are in different geographical locations, on different types of computing platforms, and/or otherwise distributed and diverse. As depicted in FIG. 1, blockchain 117a may include a unique digital article 15 (by way of non-limiting example, unique digital article 15 may be correlated with a player-controllable in-game character, as depicted, and rights pertaining to unique digital article 15 may have been recorded on blockchain 117a, as depicted). Registry server 111b may include similar components as registry server 111a, including but not limited to blockchain 117b and/or other components.

Server(s) 102 may be configured to communicate with one or more client computing platforms 104 according to a client/server architecture and/or other architectures. Client computing platform(s) 104 may be configured to communicate with other client computing platforms via server(s) 102 and/or according to a peer-to-peer architecture and/or other architectures. Players may access system 100 via client computing platform(s) 104. In some implementations, system 100 and/or registry server(s) 111 may be configured to communicate with one or more of online gaming platform(s) 105, players 123, and/or other entities and/or components, e.g., through one or more networks 13.

Server(s) 102 may include electronic storage 130, processor(s) 132, machine-readable instructions 106, and/or other components. Server(s) 102 may be configured by machine-readable instructions 106. Machine-readable instructions 106 may include one or more instruction components. Instruction components (for any set of machine-readable instructions) may include computer program components. The instruction components may include one or more of a game component 108, an interaction component 110, an account component 112, a recording component 114, a monitoring component 116, a performance component 118, a registry-analysis component 120, a notification component 122, a distribution component 124, an adjustment component 126, a release component 127, a registry component 128, an action component 129, a reward component 131, a presentation component 133, transaction component 134, receipt component 136, an input component 135, a communication component 137, and/or other instruction components. Processor(s) 132a and processor(s) 132b may be similar to processor(s) 132 as described elsewhere in this disclosure, though included in administration servers 115 and registry servers 111, respectively, as depicted in FIG. 1. Machine-readable instructions 106a and machine-readable instructions 106b may be similar to machine-readable instructions 106 as described elsewhere in this disclosure, though included in administration servers 115 and registry servers 111, respectively, as depicted in FIG. 1.

Game component 108 is configured to execute, via online gaming platform 105, one or more instances of one or more games. An instance of a game may facilitate presentation of the game to players 123. For example, the instance of the game may be an online game executed with online gaming platform 105. Game component 108 may be configured to implement in-game actions in the instance of the game, e.g., in response to (action) requests for the in-game actions by the players. These in-game actions and/or action requests may be tracked, monitored, analyzed, and/or otherwise used, e.g., as described in relation to monitoring component 116. In some implementations, game component 108 may be arranged, organized, and/or otherwise included in online gaming platform 105. As used herein, the term "game" may refer to one or more games within online gaming platform 105. In some implementations, the game may be provided via a virtual space, and may include a plurality of resource types and/or maps.

By way of non-limiting example, system 100 may track how often players interact with a game, how long players play a game, how fast players progress or level up within a game, how long players spent in an in-game store or game-related online marketplace, how much currency players spent on a game, and much more. In some implementations, players may be classified according to this tracked information (e.g., as an investor, a collector, a gamer, and/or as another classification, or combination of different classifications). For example, in some online gaming platforms 105, particular virtual items (e.g., player-controllable in-game characters that are correlated to unique digital articles) may be boxed and/or otherwise pristine and unused upon purchase. In some implementations, once the particular virtual item is unboxed and/or otherwise used within a game, its status cannot be reverted to being boxed. Keeping virtual items boxed (which is potentially more valuable) may be more typical for an investor-type player than for a gamer-type player. Buying, selling, and/or trading virtual items often may be more typical for a collector-type player than for an investor-type player (who may be more likely to hold on to boxed items for a relatively long time before doing anything with these boxed items). Likewise, in-game activity by players may be distinctive, and may be used for classification of players (or for distinguishing different levels within the same classification).

The presentation of the game may be based on the views of the game that are determined during execution of the game, e.g., as based on instructions and/or other input from players. In some implementations, the view may be communicated (e.g., by streaming, via object/position data, and/or other information) from online gaming platform 105, registry server(s) 111, and/or other sources to client computing platforms 104 for presentation to players 123. The view determined and transmitted to a given client computing platform 104 may correspond to a location in the virtual space (e.g., the location from which the view is taken, the location the view depicts, and/or other locations), a zoom ratio, a dimensionality of objects, a point-of-view, and/or view parameters. In some implementations, one or more view parameters may be selectable by player 123.

The instance of the game may include a simulated space that is accessible by players 123 by clients (e.g., client computing platforms 104) that present the views of the virtual space to a player. The simulated space may have a topography, express ongoing real-time interaction by one or more players 123, and/or include one or more objects positioned within the topography that are capable of locomotion and/or movement within the topography. In some implementations, the topography may be a 2-dimensional topography. In some implementations, the topography may be a 3-dimensional topography. The topography may include dimensions of the simulated space, and/or surface features of a surface or objects that are native to the simulated space. In some implementations, the topography may include a surface (e.g., a ground surface) that runs through at least a substantial section of the simulated space. In some implementations, the topography may describe a volume with one or more bodies positioned therein. The instance executed by the computer components may be synchronous, asynchronous, and/or semi-synchronous.

Within the instance of the game, players 123 may control characters, objects, simulated physical phenomena, and/or other elements within the virtual space to interact with the virtual space and/or each other. The characters may include avatars. As used herein, the term "character" or "player character" may refer to an object or group of objects present in the virtual space, that correspond(s) to an individual player. A particular player character may be controlled by the particular player with which it is associated. Such player characters may be referred to as player-controllable characters. In some cases, a player-controllable character may be the correlated entity that is correlated to a unique digital article. Player-controllable element(s) may move through and interact with the virtual space (e.g., non-player characters in the virtual space, other objects in the virtual space, etc.). In some implementations, player-controllable characters may be capable of locomotion within the topography of the simulated space that is included in the instance of the game. For example, different player-controllable characters may interact in the topography of the simulated space. In some implementations, the topography may include one or more restricted areas that are only accessible under certain conditions. In some implementations, player-controllable elements controlled by and/or associated with a given player may be created and/or customized by the given player. Individual players 123 and/or player accounts may own or control an inventory of virtual goods and currency (e.g., resources of a plurality of resource types) that the individual player can use (e.g., by manipulation of a player character and/or other player-controllable elements) and/or other items, to perform in-game actions within the virtual space. By way of non-limiting illustration, players 123 may include the first player and the second player that interact with online gaming platform 105. The first player and the second player may control digital articles in or through a game hosted by online gaming platform 105. In some implementations, account inventories may be managed (at least in part) using blockchain 117a. For example, ownership rights (and/or other types of rights) of individual virtual items included in an individual account inventory may be recorded on blockchain 117a. In some implementations, at least some individual virtual items (also referred to as correlated entities) may correlate to individual unique digital articles (that may be tracked by registry servers 111). In some implementations, individual account inventories may correspond to individual smart contracts stored on blockchain 117a.

Interaction component 110 may be configured to enable, facilitate, and/or implement in-game actions by players 123 in instances of games. In some implementations, interaction component 110 may be configured to operate in response to instructions and/or (action) requests by players 123. Interaction component 110 may be configured to receive requests from players 123, e.g., in-game action instructions to perform in-game actions in the instance of the game. By way of non-limiting example, in-game actions may include one or more of logging in to a game, performing a move, a dance, a movement, and/or another action within the game, accessing a level or area within the game, browsing a store/shop/marketplace within the game, using a particular item, weapon, or another resource within the game, unboxing a new player-controllable character, participating in a particular game mode (e.g., a Battle Royale mode, or team-versus-team mode), join a particular mission or team, engage in a particular type of exchange and/or challenge between players, and/or other in-game actions. For example, one or more players may interact within online gaming platform 105 to build, create, gather, find, combine, and/or otherwise generate content (i.e., player-generated content). In some implementations, a player request may request access to a particular type of store or to a particular section of a store and/or marketplace within online gaming platform 105. In some implementations, information regarding in-game actions and/or in-game action instructions by particular players may be monitored, tracked, and/or otherwise used by other components of system 100, including but not limited to monitoring component 116.

In some implementations, operations may be accomplished by interaction component 110 through user interfaces 125. In particular, operations pertaining to a particular player may be accomplished or controlled or initiated through a particular user interface 125 of a particular client computing platform 104, where the particular client computing platform 104 is associated with the particular player. In other words, the particular player may interact with an instance of a game through interaction component 110 and/or the particular user interface 125. In some implementations, operations by interaction component 110 may be limited, restricted, and/or otherwise controlled by other components of system 100. In some implementations, interaction component 110 may require acceptance from particular players (e.g., to perform certain operations). For example, an acceptance may be required to accept a particular offer to partake in an activity or agreement. In some implementations, interaction component 110 may be configured to receive indications of acceptances and/or other agreements from players.

In some implementations, interaction component 110 may be configured to facilitate interaction of players 123 with system 100. In some implementations, interaction component 110 may be configured to facilitate interaction by players 123 through user interfaces 125. For example, a particular player may be associated with a particular client computing platform 104, which may include a particular user interface 125. In other words, an individual player interface 125 may be player-specific and/or specific to a particular client computing platform 104. In some implementations, interaction component 110 may facilitate entry and/or selection through (presentation of) one or more user interfaces 125 (such as, by way of non-limiting example, any of the interfaces described in this disclosure).

Account component 112 is configured to manage player accounts. Player accounts may be associated with players 123. Player accounts may include and/or be associated with account inventories of virtual items. For example, the player accounts may include a first player account associated with a first player, a second player account associated with a second player, and so forth. For example, the first player account may include a first account inventory of one or more virtual items, the second player account may include a second account inventory of one or more virtual items and so forth. Individual players may control one or more virtual items in their individual account inventories. In some implementations, the first account inventory includes one or more unique digital articles (e.g., a first unique digital article, a first set of unique digital articles, etc.). In some implementations, the second account inventory includes one or more unique digital articles (e.g., a second unique digital article, a second set of unique digital articles, etc.). The first unique digital article may be correlated with a first in-game player-controllable character configured to be used (e.g., played with) in the instance of the game. The second unique digital article may be correlated with a second in-game player-controllable character configured to be used (e.g., played with) in the instance of the game, and so forth. In some implementations, virtual items (e.g., unique digital articles) may be associated with location information (e.g., location within the simulated space of an instance of a game, or a real-world location). In some implementations, account information may include an amount of currency spent in a game, or on unique digital articles, a rate of spending, a type of items currency has been spent on, etc.

Recording component 114 is configured to record information, assets, and/or (unique) digital articles on permanent registries 117. In some implementations, the information may include executable code, such as, e.g., smart contracts.

In some implementations, recording component 114 may record and/or modify rights pertaining to digital articles. In some implementations, recording component 114 may be configured to receive (recordation) requests to perform a recordation (e.g., of a unique digital article or a smart contract on a permanent registry). For example, recording component 114 may receive, from a first player, a recordation request to record and/or modify rights pertaining to a first unique digital article on a first permanent registry (such as, e.g., blockchain 117a). In some implementations, recording component 114 may receive such requests from online gaming platform 105 and/or other components of system 100. For example, a particular request to record (rights pertaining to) a particular unique digital article may correspond to the issuance and/or creation of that particular unique digital article. When a unique digital article or other digital article is issued and/or created, recording component 114 may record its ownership on a particular permanent registry. In some implementations, a particular request to modify rights pertaining to a particular unique digital article may correspond to an exchange of that particular unique digital article (e.g., between two players).

In some implementations, recording component 114 may be configured to record executable code on a particular permanent registry, such as, e.g., blockchain 117a. In some implementations, particular executable code may be a particular smart contract. The particular smart contract may be configured to perform one or more evaluations, e.g., based on real-world information. In some implementations, smart contracts may be configured such that one or more evaluations are based, at least in part, on geolocation information associated with players or unique digital articles.

Monitoring component 116 may be configured to monitor information on one or more permanent registries 117, including but not limited to blockchain 117a, blockchain 117b, and/or other blockchains. The monitored information may include information recorded on one or more permanent registries 117. For example, the monitored information may include player-specific recorded information, such as at least one of: recorded information specific to a particular player, to a particular player account, to a particular account inventory, to a particular set of unique digital articles (e.g., owned or controlled by the particular player), and/or otherwise player-specific information. Monitored information may include recorded information for groups of players. In some implementations, monitoring component 116 may be configured to aggregate recorded information for groups of players, e.g., to determine an average (or other aggregate number) for the number of unique digital articles owned per player, an average (or other aggregate number) of currency spent to obtain unique digital articles per player, an average (or other aggregate number) of the current estimated value of the unique digital articles owned per player, an average (or other aggregate number) differential per player between currency spent to obtain unique digital articles and current estimated value of the same unique digital articles, an average (or other aggregate number) of the age of the unique digital articles owned per player, an average (or other aggregate number) of the age of the unique digital articles when sold, and/or other aggregated information. In some implementations, recorded information may regard third-party unique digital articles or third-party NFTs that are not related to a particular game on online gaming platform 105. In some implementations, the monitored information for previously-held releases may include actual and/or estimated amounts of sales.

In some implementations, monitoring component 116 may be configured to track, monitor, analyze, and/or otherwise use information recorded on one or more permanent registries 117. In some implementations, monitoring component 116 may be configured to monitor player-specific recorded information or group-specific (i.e., for a group of players) recorded information. For example, player-specific recorded information for a particular player may include recorded information for any item in the particular player's account and/or inventory that is recorded on one or more permanent registries 117. For example, the particular player may own and/or control a set of unique digital articles for which ownership information is recorded on blockchain 117a. Monitoring component 116 may track, monitor, analyze, and/or otherwise use information from any transaction involving any of this set of unique digital articles. In some implementations, monitoring component 116 may be configured to analyze recordations and other transactions on one or more permanent registries 117, e.g., by retrieving recorded information from one or more permanent registries 117 and analyzing whether any of the recorded transactions pertain to a particular unique digital article, or a particular set of unique digital articles. By way of non-limiting example, the recorded information may include per-player information (e.g., number of unique digital articles owned, amount of currency spent on owned unique digital articles, estimated value of currently owned unique digital articles, etc.), as well as aggregate information for groups of players (e.g., a set of players that have been classified with a similar classification, such as collector). Operations by monitoring component 116 may be used to control operations by other components of system 100, including but not limited to interaction component 110.

By way of non-limiting example, monitoring component 116 may determine when or how long ago a particular unique digital article (or set of unique digital articles) was obtained by a particular player (or group of players). In some implementations, monitoring component 116 may determine how particular unique digital articles were obtained by a particular player (e.g., in-game purchase, marketplace player-to-player purchase, purchase in online shop, won in a game or challenge, etc.), or group of players. In some implementations, monitoring component 116 may determine the particular price for a particular unique digital article (or set of unique digital articles) when these were obtained by a particular player. In some implementations, monitoring component 116 may determine other recorded transactions involving a particular player (e.g., to determine whether this particular player should be classified as an investor, a collector, a gamer, and/or as another classification). In some implementations, monitoring component 116 may be configured to classify players based on information recorded on one or more permanent registries 117. Operations in system 100 may be based on these classifications. In some implementations, monitoring component 116 may determine how many unique digital articles and/or other objects are currently owned by a particular player. In some implementations, monitoring component 116 may determine and/or otherwise estimate a total value of a collection of unique digital articles that are currently owned by a particular player. In some implementations, monitoring component 116 may determine an estimated difference between a purchase price and a current value for a particular unique digital article (or set of unique digital articles) owned by a particular player. In some implementations, monitoring component 116 may determine an average number (or other aggregate number) of transactions involving unique digital articles recorded as owned by an individual player, or a group of players (e.g., sales transactions).

In some implementations, monitoring component 116 may be configured to track, monitor, analyze, and/or otherwise use information regarding in-game actions and/or in-game action instructions for particular players or groups of players. Monitoring component 116 may be configured to determine one or more (player-specific or group-specific) values for one or more in-game action metrics based on the monitored in-game actions and/or in-game action instructions. For example, monitoring component 116 may determine a value for a particular in-game action metric. In some implementations, in-game action metrics may include at least one of (i) time spent logged into the online gaming platform, (ii) time spent interacting within the instance of the game, (iii) a number of times the particular player or group has logged into the online gaming platform per a predetermined time frame (e.g., ranging between 1 day and 60 days long, or about a month, or another duration), (iv) an amount of consideration the particular player or group has spent within the online gaming platform per a predetermined time frame (e.g., ranging between 1 day and 60 days long, or about a month, or another duration). Any combination of these in-game action metrics is envisioned within the scope of this disclosure. In some implementations, in-game action metrics may include at least one of (i) a first change in time spent logged into the online gaming platform, (ii) a second change in time spent interacting within the instance of the game, (iii) a third change in a number of times the particular player or group has logged into the online gaming platform per a predetermined time frame (e.g., ranging between 1 day and 60 days long, or about a month, or another duration), (iv) a fourth change in an amount of consideration the particular player or group has spent within the online gaming platform per a predetermined time frame (e.g., ranging between 1 day and 60 days long, or about a month, or another duration). In some implementations, in-game action metrics may include a level of progress made or a milestone reached within the game. Any combination of these in-game action metrics is envisioned within the scope of this disclosure. Values for player-specific metrics may be aggregated into values for group-specific metrics.

In some implementations, monitoring component 116 may be configured to determine one or more combined values that are player-specific to a particular player. In some implementations, a combined value may be based on at least one or more player-specific values for one or more in-game action metrics and at least one or more player-specific values for one or more registry metrics. For example, a particular combination may include a decrease in the time spent within a game as measured per month (or, e.g., a decrease in the number of days per month the particular player has played for more than 5 minutes per day) combined with an increase in either time spent per month in browsing a player-to-player marketplace for unique digital articles, or an increase in the number of transactions per month of unique digital articles in which the particular player is the seller. In some implementations, a combination may include multiple player-specific values for different registry metrics. Combined values for player-specific metrics may be aggregated into combined values for group-specific metrics.

Performance component 118 may be configured to permit and/or perform (requested) in-game actions, e.g., to use particular unique digital articles. In some implementations, requests to use a particular unique digital article in accordance with a particular in-game action instruction may be granted based on one or more determinations by monitoring component 116 and/or another component of system 100. In some implementations, grants and/or performance by performance component 118 may require not only a particular type of request, but additionally may require the pertinent unique digital article (or other digital article that is not fungible) currently be recorded on a particular permanent registry (or a particular type of permanent registry). For example, a requirement for grants or performance may include recordation on a private permissioned permanent registry. In some implementations, actions by performance component 118 may be performed responsive to particular actions or results from other components of system 100, including but not limited to monitoring component 116 and/or registry-analysis component 120.

Registry-analysis component 120 may be configured to determine values for registry metrics. Determinations by registry-analysis component 120 may be based on information and/or determinations by other components, including but not limited to monitoring component 116. In some implementations, registry-analysis component 120 may be configured to compare values of registry metrics, e.g., with one or more threshold levels. For example, registry-analysis component 120 may compare one or more (player-specific or group-specific) values for one or more registry metrics with one or more threshold levels.

In some implementations, registry metrics may include at least one of (i) a number of unique digital articles recorded on a particular permanent registry as owned by a particular player or group, (ii) a change in the number of unique digital articles recorded on the particular permanent registry as owned by the particular player or group, wherein the change is measured within a predetermined time frame, wherein the predetermined time frame is between 1 day and 60 days long, and (iii) a rate of change in the number of unique digital articles recorded on the particular permanent registry as owned by the particular player or group, wherein the rate of change is determined by comparing changes within a sequence of predetermined time frames, wherein the predetermined time frames are between 7 days and days long. Any combination of these registry metrics is envisioned within the scope of this disclosure.

In some implementations, registry metrics may include at least one of (i) estimated value of the unique digital articles recorded as owned by a particular player, (ii) a change in the estimated value of the unique digital articles recorded as owned by the particular player wherein the change is measured within a predetermined time frame, wherein the predetermined time frame is between 1 day and 60 days long, and (iii) a rate of change in the estimated value of the unique digital articles recorded as owned by the particular player, wherein the rate of change is determined by comparing changes within a sequence of predetermined time frames, wherein the predetermined time frames are between 7 days and days long. Any combination of these registry metrics is envisioned within the scope of this disclosure.

In some implementations, registry metrics may include at least one of (i) a number of transactions involving the unique digital articles recorded as owned by a particular player or group in which they are the seller, (ii) a change in the number of transactions involving the unique digital articles recorded as owned by the particular player or group in which they are the seller, wherein the predetermined time frame is between 1 day and 60 days long, and (iii) a rate of change in the number of transactions involving the unique digital articles recorded as owned by the particular player or group in which they are the seller, wherein the rate of change is determined by comparing changes within a sequence of predetermined time frames, wherein the predetermined time frames are between 7 days and 30 days long. Any combination of these registry metrics is envisioned within the scope of this disclosure.

In some implementations, registry metrics may include at least one of (i) a number of unique digital articles recorded on a public permanent registry as owned by a particular player, (ii) a change in the number of unique digital articles recorded on the public permanent registry as owned by the particular player, wherein the change is measured within a predetermined time frame, wherein the predetermined time frame is between 1 day and 60 days long, and (iii) a rate of change in the number of unique digital articles recorded on the public permanent registry as owned by the particular player, wherein the rate of change is determined by comparing changes within a sequence of predetermined time frames, wherein the predetermined time frames are between 7 days and 30 days long. Any combination of any of the registry metrics in any of the preceding paragraphs is envisioned within the scope of this disclosure.

Notification component 122 may be configured to notify players. For example, notification component 122 may notify players 123 in response to releases, events, distributions, in-game action instructions, and/or other activities in system 100. In some implementations, a player may be notified responsive to a requested in-game action (as requested through an in-game action instruction) not being permitted or not being performed (e.g., as determined by performance component 118). In some implementations, actions by notification component 122 may be performed responsive to particular actions, results, determinations, evaluations, consequences, and/or decisions from other components of system 100, including but not limited to monitoring component 116, performance component 118, registry-analysis component 120, and/or release component 127. For example, notification component 122 may control whether to notify a particular player based on one or more release parameters (e.g., as determined by release component 127). In some implementations, notifications may be outside of the game, or even outside of online gaming platform 105 (e.g., through a text message, email, or a direct message).

Action component 129 may be configured to control actions based on one or more release parameters. In some implementations, the actions may include notifications. In some implementations, the actions may include making and/or presenting offers to players (e.g., offers for one or more virtual items that are part of a release). In some implementations, action component 129 may be configured to control taking an action and/or making a recommendation, based on one or more release parameters (e.g., control the release of a set of unique digital articles in accordance with one or more release parameters, e.g., as determined by release component 127).

Distribution component 124 may be configured to distribute and/or otherwise provide one or more of information, access to in-game content, access to game-specific communication channels, certificates, rewards, awards, prizes, distribution gains, and/or virtual items to players 123. For example, distribution component 124 may provide a particular distribution of a particular award to a particular unique digital article or player, such that the pertinent account inventory is increased by the particular award. A particular distribution may be provided to a particular player as part of a release.

Distributions by distribution component 124 may be adjusted, e.g., by adjustment component 126. In some implementations, distributions may be based on operations (including but not limited to determinations) by monitoring component 116 and/or registry-analysis component 120. In some implementations, distributions may be responsive to determinations by reward component 131 or release component 127. In some implementations, distributions may be based on and/or responsive to actions by other components of system 100, including but not limited to registry server 111, a particular permanent registry, and/or registry-analysis component 120. For example, online gaming platform 105 may determine a particular player is eligible to participate in a release. Distribution component 124 may distribute unique digital articles accordingly. For example, a reward may be a participation reward. For example, an award may be an attendance award (e.g., for a real world event). For example, a certificate may be a certificate of completion or accomplishment, which may be specific to actions within the instance of the game. For example, a prize may be for effort, time, and/or resources spent, specifically in the instance of the game. For example, particular unique digital articles may be associated with distribution rights, and the particular player who owns those distribution rights may receive distribution gains in accordance with those distribution rights. For example, distribution gains may result from a particular action or activity (such as, e.g., a sale of a particular digital article), e.g., within the online gaming platform 105, involving the particular digital article.

Adjustment component 126 may be configured to adjust and/or modify distributions, including (planned or expected) distributions by distribution component 124. In some implementations, adjustment component 126 may be configured to adjust and/or modify consequences, such as positive or negative consequences. In some implementations, adjustment component 126 may be configured to adjust and/or modify awards based on geolocation information. In some implementations, adjustment component 126 may adjust and/or modify one or more awards, certificates, rewards, awards, prizes, distribution gains, stakes, and/or virtual items that have been determined, e.g., by reward component 131 (also referred to as the determined distribution, the eligible distribution, or the determined consequence). Upon such adjustment and/or modification, this determined distribution (or eligible distribution) may be referred to as the adjusted distribution. Distribution component 124 may distribute the adjusted distribution. In some implementations, adjustments and/or modifications by adjustment component 126 may increase the value of one or more elements of the eligible distribution (this may provide a positive incentive to players). Alternatively, and/or simultaneously, adjustments and/or modifications by adjustment component 126 may decrease the value of one or more elements of the eligible distribution (this may provide a negative incentive to players). In some implementations, actions by adjustment component 126 may be performed responsive to particular actions or results from other components of system 100, including but not limited to monitoring component 116 and/or registry-analysis component 120.

Release component 127 may be configured to determine one or more release parameters for releases of sets of unique digital articles. In some implementations, individual release parameters may be based on one or more (player-specific or group-specific) values for one or more registry metrics (e.g., as determined by registry-analysis component 120 and/or other components of system 100). In some implementations, individual release parameters may be based on comparisons of one or more (player-specific or group-specific) values for one or more registry metrics (e.g., as compared by registry-analysis component 120 and/or other components of system 100). For example, a particular value may reach a level such that an action is taken or recommended (e.g., by action component 129). In some implementations, such a level may correspond to breaching one or more threshold levels as described for registry-analysis component 120.

In some implementations, individual release parameters may be based on a combination of at least one (player-specific or group-specific) value for at least one in-game action metric and at least one (player-specific or group-specific) value for at least one registry metric. For example, a particular value of a particular in-game action metric may in isolation be insufficient to take or recommend a particular action (say, set a particular release parameter to a first value). As another example, a different particular value of a particular registry metric may in isolation be insufficient to take or recommend the particular action of setting the particular release parameter to the first value. However, these two values in combination may be sufficient to take or recommend the particular action of setting the particular release parameter to the first value.

In some implementations, release component 127 may determine one or more of the number of unique digital articles being released, the number of different types of unique digital articles being released, the price per unique digital article, how long the sale and/or release will be open (e.g., for a limited time, or indefinitely until the supply is exhausted), what will happen to unsold items of a release (e.g., burn or save for a later sale, etc.), how the release will be announced (e.g., through which communication channels), to which users (or which classes/groups of users) the announcements of a release will be communicated, how long in advance of the opening of a release the announcements of the release will be communicated, whether to include a requirement that users register to be eligible to participate in a release, whether to include requirements about which (groups and/or classes of) users will be eligible to participate in a release (e.g., new users only, or experienced collectors only, etc.), what time of day to open a release, what day of the week or month to open a release, how long to wait after the most recent previous release, how many releases to plan in a predetermined period of a month (or two months, or three months), and/or other release parameters. Determinations my release component 127 may be based on a combination of monitored in-game activity by a set of players (e.g., more than 100 players, or more than 1000 players, or another number) and monitored recorded information for a set of users (e.g., more than 100 users, or more than 1000 users, or another number). In some implementations, one or both of the monitored in-game activity and the monitored recorded information may relate past releases to release parameters used for the past releases. This may form the basis for expected results of a new release. For example, using a first set of release parameters, a new release may be expected to generate a first amount in sales, and using a second set of release parameters, the same release may be expected to generate a second amount in sales. Accordingly, an administrator may select either the first set of release parameters or the second set of release parameters, as desired. For example, the administrator may select the set of release parameters that has the highest expected amount in sales. For example, the first set of release parameters may include a sales price of $10 for each of 1000 unique digital articles, whereas the second set of release parameters may include a sales price of $100 for each of 100 unique digital articles.

Registry component 128 may be configured to generate sets of instructions for registry servers 111 (e.g., registry server 111*a*) and/or one or more permanent registries 117 (e.g., blockchain 117*a*). In some implementations, registry component 128 may be configured to transfer the generated sets of instructions to registry servers 111 and/or one or more permanent registries 117. In some implementations, one or more of these instructions may instruct the formation of a smart contract and/or the recording of the smart contract on one or more permanent registries 117 (e.g., blockchain 117*a*). In some implementations, one or more of these instructions may call and/or otherwise invoke a method or function of a smart contract on one or more permanent registries 117 (e.g., blockchain 117*a*). In some implementations, these instructions may instruct registry servers 111 to record and/or modify (sets of) unique digital articles, transactions, and/or rights on one or more permanent registries 117, or to analyze ownership as recorded on one or more permanent registries 117. In some implementations, these instructions may instruct registry servers 111 to record and/or modify sets of usage information (e.g., ownership rights) pertaining to (sets of) unique digital articles. For example, registry component 128 may transfer a particular set of instructions that, upon execution by blockchain 117*a*, issue a new unique digital article to a particular player or particular account (i.e., record the rights and/or other usage information pertaining to the new unique digital article, including it being owned by the particular player or the particular account). Individual unique digital articles may be associated with individual sets of usage information, including but not limited to ownership rights. For example, registry component 128 may transfer a particular set of instructions that, upon execution by blockchain 117*a* and blockchain 117*b*, remove a particular unique digital article from blockchain 117*a* and add the particular unique digital article to blockchain 117*b*. For example, registry component 128 may transfer a particular set of instructions that, upon execution by blockchain 117*a* and blockchain 117*b*, analyze whether a particular player owns one or more particular unique digital articles.

Reward component 131 may be configured to determine one or more of information, awards, access to in-game content, access to game-specific communication channels, certificates, rewards, prizes, distribution gains, and/or virtual items to be rewarded to one or more players. In some implementations, these types of determinations may be based on and/or responsive to actions by other components of system 100, including but not limited to registry-analysis component 120. In some implementations, online gaming platform 105 may determine a particular player is eligible to receive one or more rewards or awards. Distributions of awards may be made by distribution component 124. In some implementations, (one or more elements of) these awards may be adjusted and/or modified by adjustment component 126 prior to being distributed.

Presentation component 133 may be configured to present interfaces (e.g., user interfaces 125) to players, e.g., through client computing platforms 104 associated with the respective players. In some implementations, presentation component 133 may be configured to effectuate presentations of interfaces to players 123. In some implementations, presentations by presentation component 133 may be performed jointly (or at least in some cooperative manner) with one or both of game component 108 and/or interaction component 110. Presentation component 133 may present offers (e.g., for exchanges with other players, or for exposure to consequences) to particular players.

Receipt component 136 may be configured to receive (sets of) instructions to add, modify, analyze, and/or remove recorded information (e.g., rights) in blockchain 117*a*. For example, receipt component 136 may receive one or more sets of instructions from registry component 128, online gaming platform 105, and/or other components of system 100. Receipt component 136 may provide received sets of instructions to record component 134 for execution. In some implementations, execution of individual ones of the instructions received may include invoking one or more function calls of an Application Programming Interface (API) 107. For example, API 107 may be configured to provide interactive communication between blockchain 117*a* and other components of system 100. For example, in some implementations, API 107 may support methods or functions that are implemented as function calls to smart contracts stored on blockchain 117*a*. For example, in some implementations, API 107 may support methods or functions that analyze whether a particular player owns one or more particular unique digital articles, one or more particular types of unique digital articles, and/or a particular collection of multiple unique digital articles. For example, in some implementations, API 107 may support methods or functions that analyze the status of a particular (type of) metric for a particular player. In some implementations, receipt component 136 may be arranged, organized, and/or otherwise included in registry server 111 and/or blockchain 117*a*.

Transaction component 134 may be configured to record information, including but not limited to (ownership) rights pertaining to digital articles, e.g., on one or more permanent registries 117, such as blockchain 117*a*. In some implementations, transaction component 134 may record information on electronic storage 130*b*. In some implementations, transaction component 134 may record information on blockchain 117*a*. The information may include ownership rights, distribution rights, other rights, and/or other information. For example, particular recorded information may reflect rights pertaining to a particular digital article by a particular player or group of players. For example, a particular unique digital article may represent a three-dimensional in-game player-controllable item or character that can interact with other virtual items within online gaming platform 105. Recorded information may be specific to a digital article (i.e., article-specific). For example, distribution rights for a particular digital article may designate rights to certain distributions of awards upon a specifically defined in-game action (e.g., an exchange between players) involving the particular digital article.

In some implementations, transaction component 134 may be configured to record information in blockchain 117*a*. In some implementations, transaction component 134 may add, modify, analyze, and/or remove recorded information. For example, in accordance with received instructions from receipt component 136, transaction component 134 may transfer rights pertaining to a particular digital article from a first owner to a second owner (e.g., from an original owner to a new owner, or from a loser of a challenge to a winner of the challenge) such that the recorded information on blockchain 117*a* no longer reflect the rights pertaining to the particular digital article by the first player. In some implementations, in accordance with received instructions, transaction component 134 may transfer rights pertaining to a particular digital article temporarily, e.g., from a first owner to a temporary second owner such as a smart contract. In some case, a temporary owner may be a holding account that is merely used until ownership is transferred to either the original owner or a new owner. As used herein, the term "temporary" (and derivatives thereof) refers to a transfer or to ownership that is either known to be changed and/or modified within a predetermined period, or expected to be changed and/or modified within a predetermined period. Conversely, a non-temporary transfer from a first owner to a second owner (due to a particular exchange) can conceivably be changed and/or reverted (back from the second owner to the first owner) due to a separate and new exchange that is independent of the first particular exchange. In some implementations, in accordance with received instructions, transaction component 134 may transfer rights pertaining to a particular digital article non-temporarily from a first owner to a second owner, e.g., when a particular exchange is not reversible or no longer reversible. In some implementations, transaction component 134 may be arranged, organized, and/or otherwise included in blockchain 117a.

In some implementations, transaction component 134 may be configured to obtain article-specific information (e.g., ownership rights, distribution rights, and/or other information) for particular digital articles. In some implementations, transaction component 134 may be configured to access blockchain 117a to obtain the article-specific information (that are recorded on blockchain 117a, e.g., in one or more smart contracts).

Input component 135 may be configured to receive user input from administrative users. For example, the user input may include entry and/or selection of particular information, unique digital articles, types of digital articles, virtual items, types of virtual items, and/or any entity or object that interacts with any part of system 100 and/or plays a part in the operation of system 100. For example, an administrative user may select a threshold level to be used for comparisons of player-specific or group-specific values of a registry metric. For example, an administrative user may select one or more release parameters to be used for a release. For example, an administrative user may select a particular set of unique digital articles for a release. Additionally, in some implementations, the administrative user may select a particular adjustment to be enacted by adjustment component 126. Additionally, the administrative user may select one or more release parameters to be determined by release component 127 for a particular release.

Communication component 137 may be configured to facilitate communication and/or interaction between administration server 115 and the rest of system 100. For example, communication component 137 may communicate user input received from administrative users by input component 135 to other components of system 100, particularly online gaming platform 105.

Figure 3:
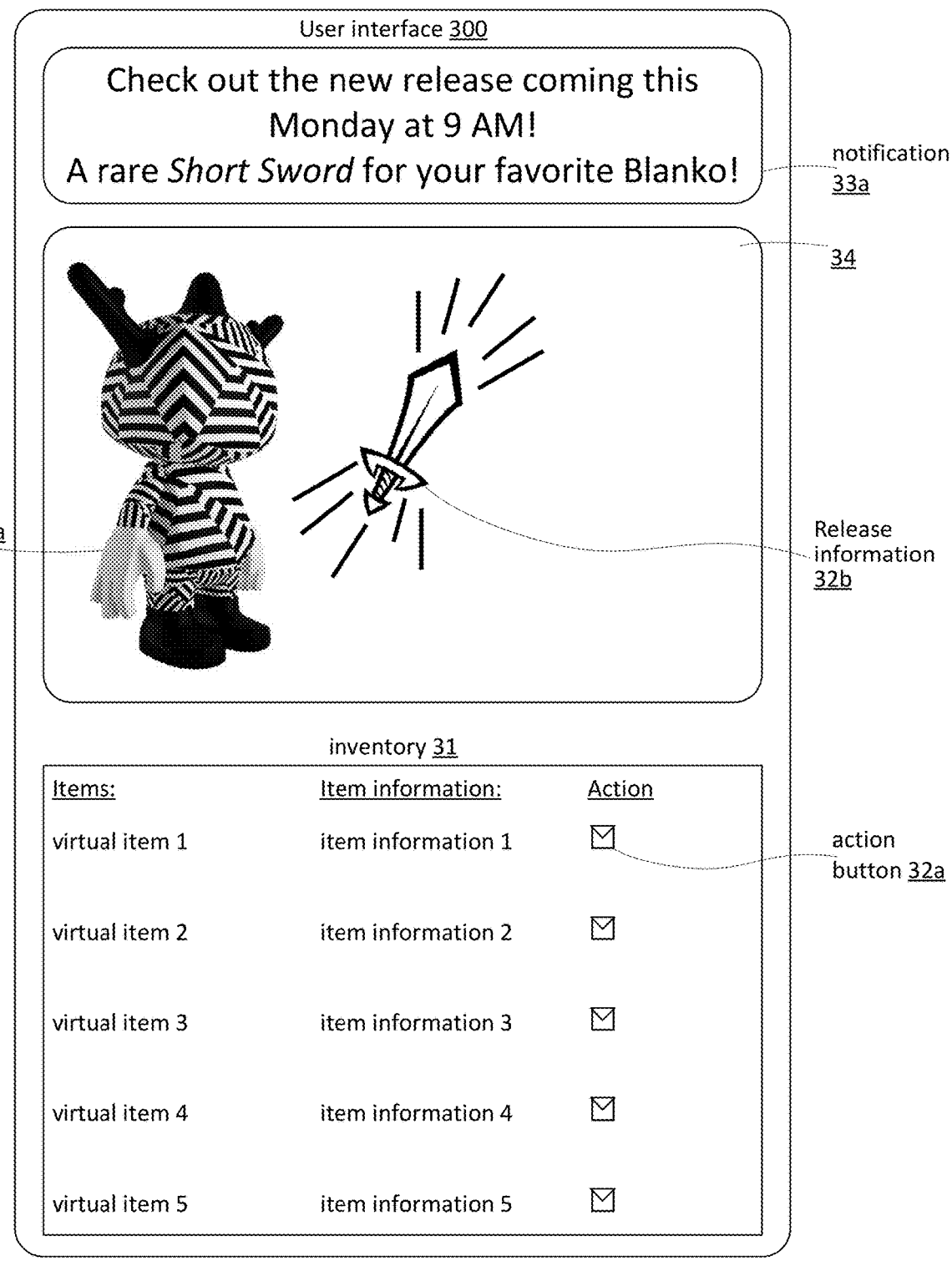
FIG. 3 illustrates an example implementation of a player interface, as may be used by a system configured to combine permanent registry information and in-game activity information to determine release logistics, in accordance with one or more implementations.

FIG. 3 illustrates an example implementation of a user interface 300 as may be used by system 100, in accordance with one or more implementations. User interface 300 may enable a particular player (say, "Alice", not depicted) to view and/or use an account inventory and/or one or more unique digital articles controlled by the particular player. User interface 300 may include a section or field for account inventory 31, and/or other graphical player interface elements. As depicted, account inventory 31 may include a list of different virtual items and/or articles currently controlled by Alice, including virtual items 1-2-3-4-5. Account inventory 31 further depicts item information regarding these virtual items, as indicated by item information 1-2-3-4-5, which correspond to virtual items 1-2-3-4-5, respectively. Account inventory 31 as depicted may further include graphical user interface elements such as, by way of non-limiting example, an action button 32a (which initiates an in-game action instruction). Upon engagement by Alice, in-game action instruction button 32a may request "virtual item 1" to be used for a particular request (e.g., through a text field or a dropdown menu, as indicated by a triangle in a box). For example, Alice may request (or select) to use unique digital article to play in the game. Unique digital article 15a may be associated with a player-controllable in-game character 15a that is also depicted in user interface 300. User interface 300 as depicted may further include graphical user interface elements such as, by way of non-limiting example, release information 32b and a notification element 33a, labeled "Check out the new release coming this Monday at 9 AM! A rare Short Sword for your favorite Blanko!" Presentation of this notification and opening of this release (i.e., the release of a sword as described by notification element 33a and shown by release information 32b) may be prompted by determinations by release component 127.

Figure 5A:
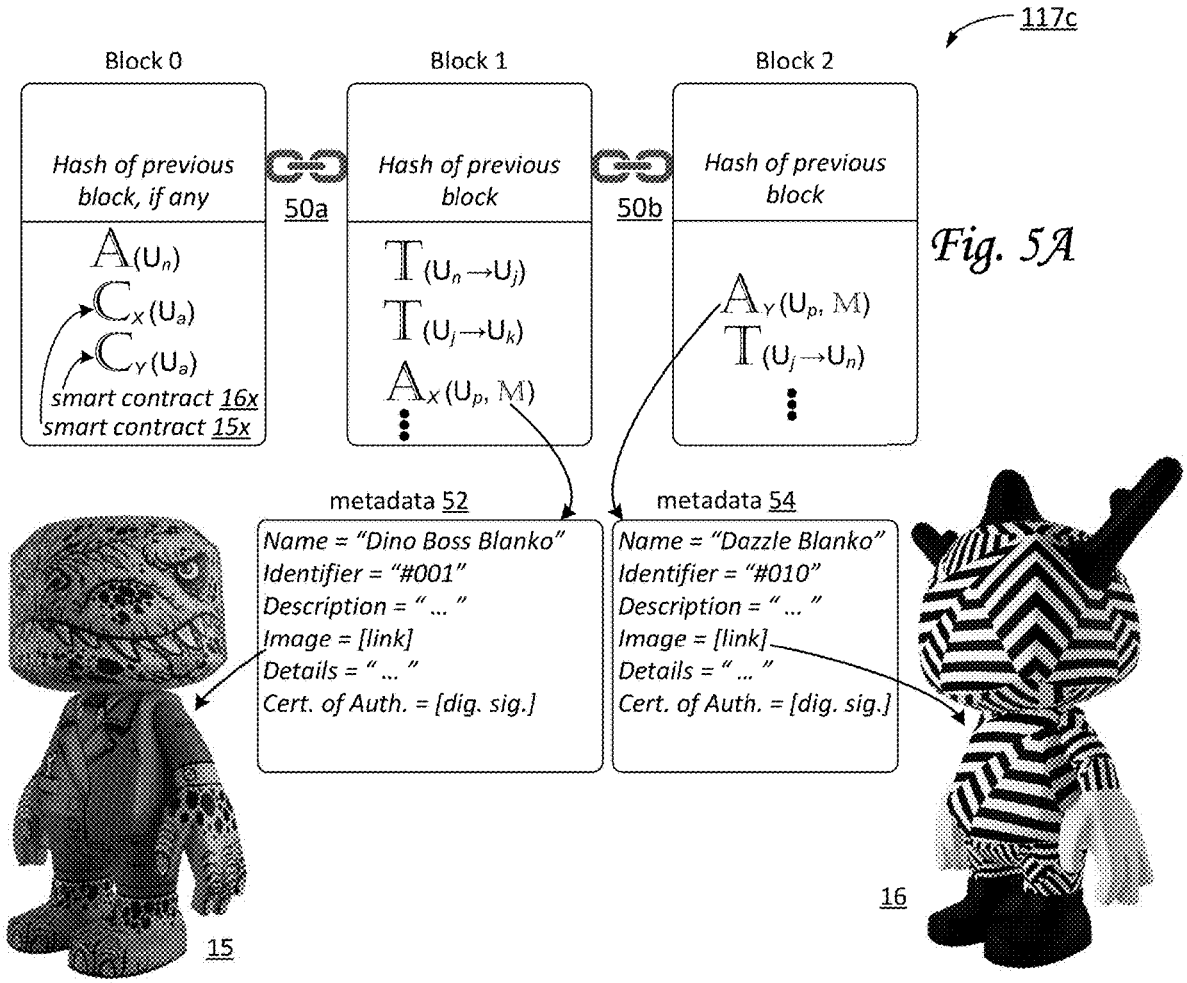
FIGS. 5A-5B illustrate exemplary permanent registries, as may be used by a system configured to combine permanent registry information and in-game activity information to determine release logistics, in accordance with one or more implementations.

FIG. 5A illustrate exemplary blockchain 117c as may be used by system 100, in accordance with one or more implementations. FIG. 5A illustrates a blockchain 117c that includes a block 0, a block 1, and a block 2. As time progresses, more blocks may be added to blockchain 117c. The blocks within blockchain 117c are ordered. In block 0, one article (indicated by a capital "A") is generated and/or assigned to player "n" (U n). A second digital article, a smart contract 15x is assigned to player "a" (U a), and a third digital article, a smart contract 16x, is assigned to player "a" (U a), which may be an administrative user. For example, smart contract 15x and smart contract 16x may be or include templates for issuing particular types of unique digital articles. Smart contract 15x and smart contract 16x may have been posted to blockchain 117c by a component similar to record component 134.

For example, the articles in block 0 may include individual ownership rights recorded for particular digital articles within an online gaming platform, similar to or the same as online game platform 105. Block 1 is connected to block 0 (as indicated by a link 50a), for example by including an address of block 1 in block 0, or vice versa. Likewise, block 1 is connected to block 2, as indicated by a link 50b. In block 1, a transaction to smart contract 15x (indicated by "Ax") is recorded. Transaction Ax to smart contract 15x may issue a unique digital article to player "p", the unique digital article being defined by metadata 52. Here, metadata 52 is correlated to a player-controllable character named "Dino Boss Blanko", having identifier "#001", as depicted by a linked image of unique digital article 15, as well as including various other fields of information, including a digital signature that serves as a certificate of authenticity. In block 1, another transactions from player "n" to player "j", and from player "j" to player "k" are also recorded. In block 2, several transactions may be recorded: a transaction from player "j" to player "n", and a transaction to smart contract 16x (indicated by "$A_Y$") is recorded. Transaction $A_Y$ to smart contract 16x may issue a unique digital article to player "p", the unique digital article being defined by metadata 54 (here, correlated to a player-controllable character named "Dazzle Blanko", having identifier "#010", as depicted by a linked image of unique digital article 16, as well as including various other fields of information). In block 2, another transaction is recorded, from player "j" to player "n".

Figure 5B:
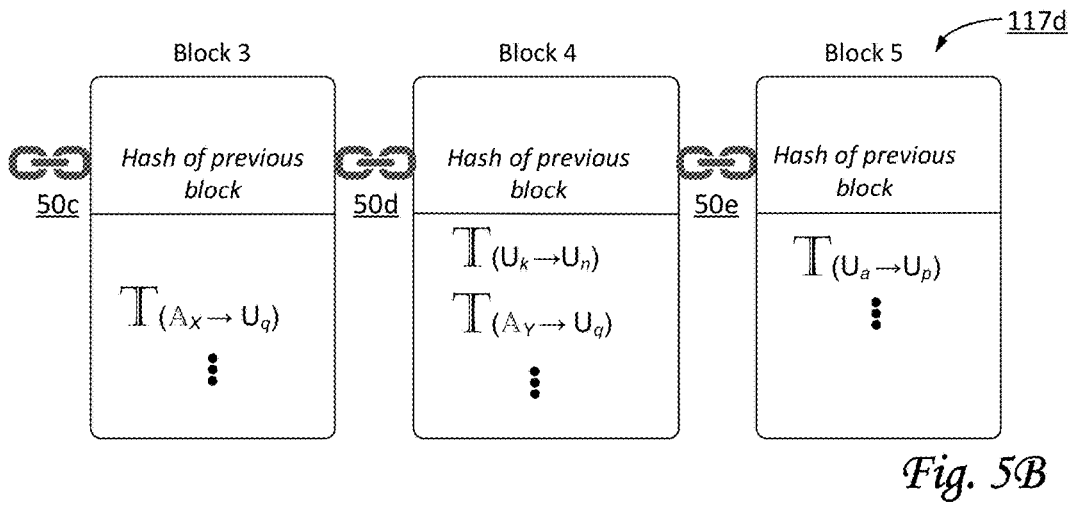

By way of non-limiting example, FIG. 5B illustrates a blockchain 117d that includes several blocks (block 3, block 4, block 5), that have been appended to blockchain 117c. Block 3 may be connected to block 2 (as indicated by link 50c), block 4 may be connected to block 3 (as indicated by a link 50d), and block 5 may be connected to block 4 (as indicated by a link 50e). In block 3, another transaction may be recorded that modifies the rights pertaining to the unique digital article (indicated by "Ax" and defined by metadata 52) to player "q", such that player "p" no longer owns this "Dino Boss Blanko". Block 4 includes a transaction (indicated by a capital "T") from player "k" to player "n". For example, the transaction may represent a purchase of a first virtual item by player "n" from seller player "k". Additionally, block 4 includes a transaction that modifies the rights pertaining to the unique digital article (indicated by "$A_y$" and defined by metadata 54) to player "q", such that player "p" no longer owns this "Dazzle Blanko". For example, these transactions in combination (and taken in context) may indicate relatively high selling activity for player "p". Block 5 includes a transaction from player "a" to player "p", which may represent the provision of a gift and/or an award based on monitored activity of user "p". Based on monitoring recorded activity for 100s or 1000s of players, system 100 may recommend particular release parameters for new releases.

Figure 4:
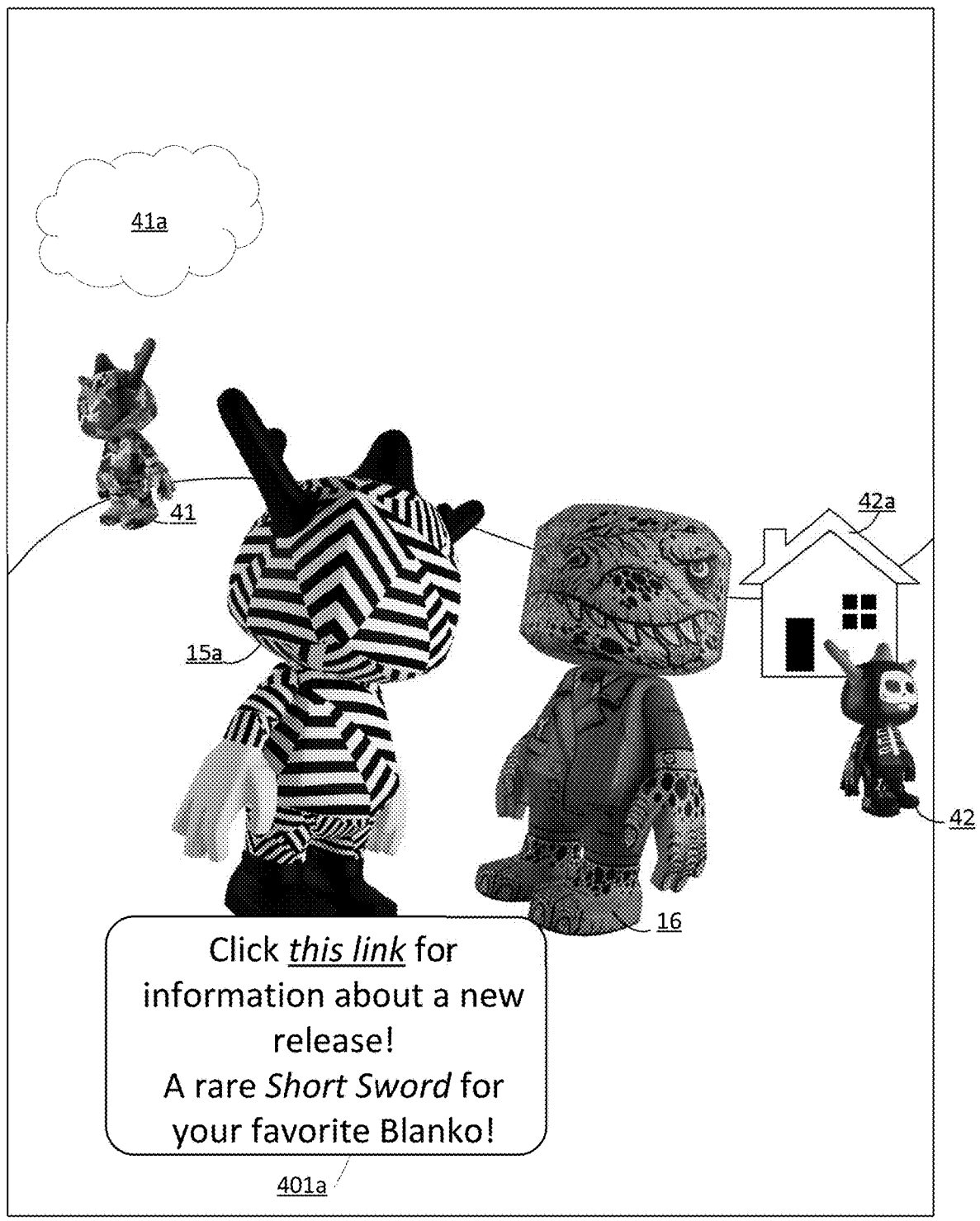
FIG. 4 illustrates an exemplary view of interactive gameplay in an instance of a game, as may be used by a system configured to combine permanent registry information and in-game activity information to determine release logistics, in accordance with one or more implementations.

By way of non-limiting example, FIG. 4 depicts a view 400 of interactive gameplay by a particular player (say, "Alice", not depicted), using unique digital article 15a (depicted as a particular in-game player-controllable character). Other players may be active and present in view 400 (depicting a topography of a simulated space included in the instance of a game), for example a first player-controllable character 41 (standing below a cloud 41a), a second player-controllable character 42 (standing near an in-game structure 42a that looks like a house), and unique digital article 16. A component of system 100 may notify Alice as indicated by a notification 401a, labeled "Click this link for information about a new release! A rare Short Sword for your favorite Blanko!".

Referring to FIG. 1, user interfaces 125 may be configured to facilitate interaction between players 123 and system 100 and/or between players 123 and client computing platforms 104. For example, user interfaces 125 may provide an interface through which players 123 may provide information to and/or receive information from system 100. In some implementations, user interface 125 may include one or more of a display screen, touchscreen, monitor, a keyboard, buttons, switches, knobs, levers, mouse, microphones, sensors to capture voice commands, sensors to capture body movement, sensors to capture hand and/or finger gestures, and/or other player interface devices configured to receive and/or convey player input. In some implementations, one or more user interfaces 125 may be included in one or more client computing platforms 104. In some implementations, one or more user interfaces 125 may be included in system 100. In some implementations, user interface 125 may be a type of interface that facilitates the exchange of virtual items between players.

Referring to FIG. 1, in some implementations, online gaming platforms 105, server(s) 102, client computing platform(s) 104, administration servers 115, registry servers 111, and/or external resources 138 may be operatively linked via one or more electronic communication links. For example, such electronic communication links may be established, at least in part, via one or more networks 13 such as the Internet and/or other networks. It will be appreciated that this is not intended to be limiting, and that the scope of this disclosure includes implementations in which online gaming platforms 105, server(s) 102, client computing platform(s) 104, administration servers 115, registry servers 111, and/or external resources 138 may be operatively linked via some other communication media.

A given client computing platform 104 may include one or more processors configured to execute computer program components. The computer program components may be configured to enable an expert or player associated with the given client computing platform 104 to interface with system 100 and/or external resources 138, and/or provide other functionality attributed herein to client computing platform(s) 104. By way of non-limiting example, the given client computing platform 104 may include one or more of a desktop computer, a laptop computer, a handheld computer, a tablet computing platform, a NetBook, a Smartphone, a gaming console, and/or other computing platforms. In some implementations, individual client computing platforms 104 may be configured to determine geolocation information for a current location of the individual client computing platforms 104. For example, an individual client computing platform 104 may include a geolocation sensor (e.g., a Global Positioning System or GPS device). The geolocation sensor may be configured to generate output signals conveying GPS information (e.g., a set or range of GPS coordinates) and/or other geolocation information, which may be used by the individual client computing platform 104 to determine the current location of the individual client computing platform 104.

Administration server(s) 115 may include one or more of servers 102a, processors 132a, machine-readable instructions 106a, electronic storage 130a, and/or other components. Server(s) 102a may be configured by machine-readable instructions 106a. Machine-readable instructions 106a may include one or more instruction components. The instruction components may include one or more of input component 135, communication component 137, and/or other instruction components. Administration server 115 may include communication lines, or ports to enable the exchange of information with a network and/or other computing platforms. In some implementations, administration servers 115 may be used by one or more administrative users, e.g., to configure and/or control operation of system 100. In some implementations, administrative servers 115 may include or player one or more player interfaces to receive player input and/or otherwise interact with one or more administrative users.

External resources 138 may include sources of information outside of system 100, external entities participating with system 100, external providers of computation and/or storage services, and/or other resources. In some implementations, some or all of the functionality attributed herein to external resources 138 may be provided by resources included in system 100. In some implementations, one or more external resources 138 may provide information (e.g., event information regarding events that are occurring and/or have occurred in the real world) to other components of system 100. In some implementations, external resources 138 may include one or more real-world information servers or blockchain oracles.

Server(s) 102 may include communication lines, or ports to enable the exchange of information with a network and/or other computing platforms. Illustration of server(s) 102 in FIG. 1 is not intended to be limiting. Server(s) 102 may include a plurality of hardware, software, and/or firmware components operating together to provide the functionality attributed herein to server(s) 102. For example, server(s) 102 may be implemented by a cloud of computing platforms operating together as server(s) 102.

Electronic storage 130 may comprise non-transitory storage media that electronically stores information. The electronic storage media of electronic storage 130 may include one or both of system storage that is provided integrally (i.e., substantially non-removable) with server(s) 102 and/or removable storage that is removably connectable to server(s) 102 via, for example, a port (e.g., a USB port, a firewire port, etc.) or a drive (e.g., a disk drive, etc.). Electronic storage 130 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 130 may include one or more virtual storage resources (e.g., cloud storage, a virtual private network, and/or other virtual storage resources). Electronic storage 130 may store software algorithms, information determined by processor(s) 132, information received from server(s) 102, information received from client computing platform(s) 104, and/or other information that enables server(s) 102 to function as described herein.

Processor(s) 132 may be configured to provide information processing capabilities in server(s) 102. As such, processor(s) 132 may include one or more of a digital processor, an analog processor, a digital circuit designed to process information, an analog circuit designed to process information, a state machine, and/or other mechanisms for electronically processing information. Although processor(s) 132 is shown in FIG. 1 as a single entity, this is for illustrative purposes only. In some implementations, processor(s) 132 may include a plurality of processing units. These processing units may be physically located within the same device, or processor(s) 132 may represent processing functionality of a plurality of devices operating in coordination. Processor(s) 132 may be configured to execute components 108, 110, 112, 114, 116, 118, 120, 122, 124, 126, 127, 128, 129, 131, 133, 134, 135, 136, and/or 137, and/or other components. Processor(s) 132 may be configured to execute components 108, 110, 112, 114, 116, 118, 120, 122, 124, 126, 127, 128, 129, 131, 133, 134, 135, 136, and/or 137, and/or other components by software; hardware; firmware; some combination of software, hardware, and/or firmware; and/or other mechanisms for configuring processing capabilities on processor(s) 132. As used herein, the term "component" may refer to any component or set of components that perform the functionality attributed to the component. This may include one or more physical processors during execution of processor readable instructions, the processor readable instructions, circuitry, hardware, storage media, or any other components.

It should be appreciated that although components 108, 110, 112, 114, 116, 118, 120, 122, 124, 126, 127, 128, 129, 131, 133, 134, 135, 136, and/or 137 are illustrated in FIG. 1 as being implemented within a single processing unit, in implementations in which processor(s) 132 includes multiple processing units, one or more of components 108, 110, 112, 114, 116, 118, 120, 122, 124, 126, 127, 128, 129, 131, 133, 134, 135, 136, and/or 137 may be implemented remotely from the other components. The description of the functionality provided by the different components 108, 110, 112, 114, 116, 118, 120, 122, 124, 126, 127, 128, 129, 131, 133, 134, 135, 136, and/or 137 described below is for illustrative purposes only, and is not intended to be limiting, as any of components 108, 110, 112, 114, 116, 118, 120, 122, 124, 126, 127, 128, 129, 131, 133, 134, 135, 136, and/or 137 may provide more or less functionality than is described. For example, one or more of components 108, 110, 112, 114, 116, 118, 120, 122, 124, 126, 127, 128, 129, 131, 133, 134, 135, 136, and/or 137 may be eliminated, and some or all of its functionality may be provided by other ones of components 108, 110, 112, 114, 116, 118, 120, 122, 124, 126, 127, 128, 129, 131, 133, 134, 135, 136, and/or 137. As another example, processor(s) 132 may be configured to execute one or more additional components that may perform some or all of the functionality attributed below to one of components 108, 110, 112, 114, 116, 118, 120, 122, 124, 126, 127, 128, 129, 131, 133, 134, 135, 136, and/or 137.

Figure 2:
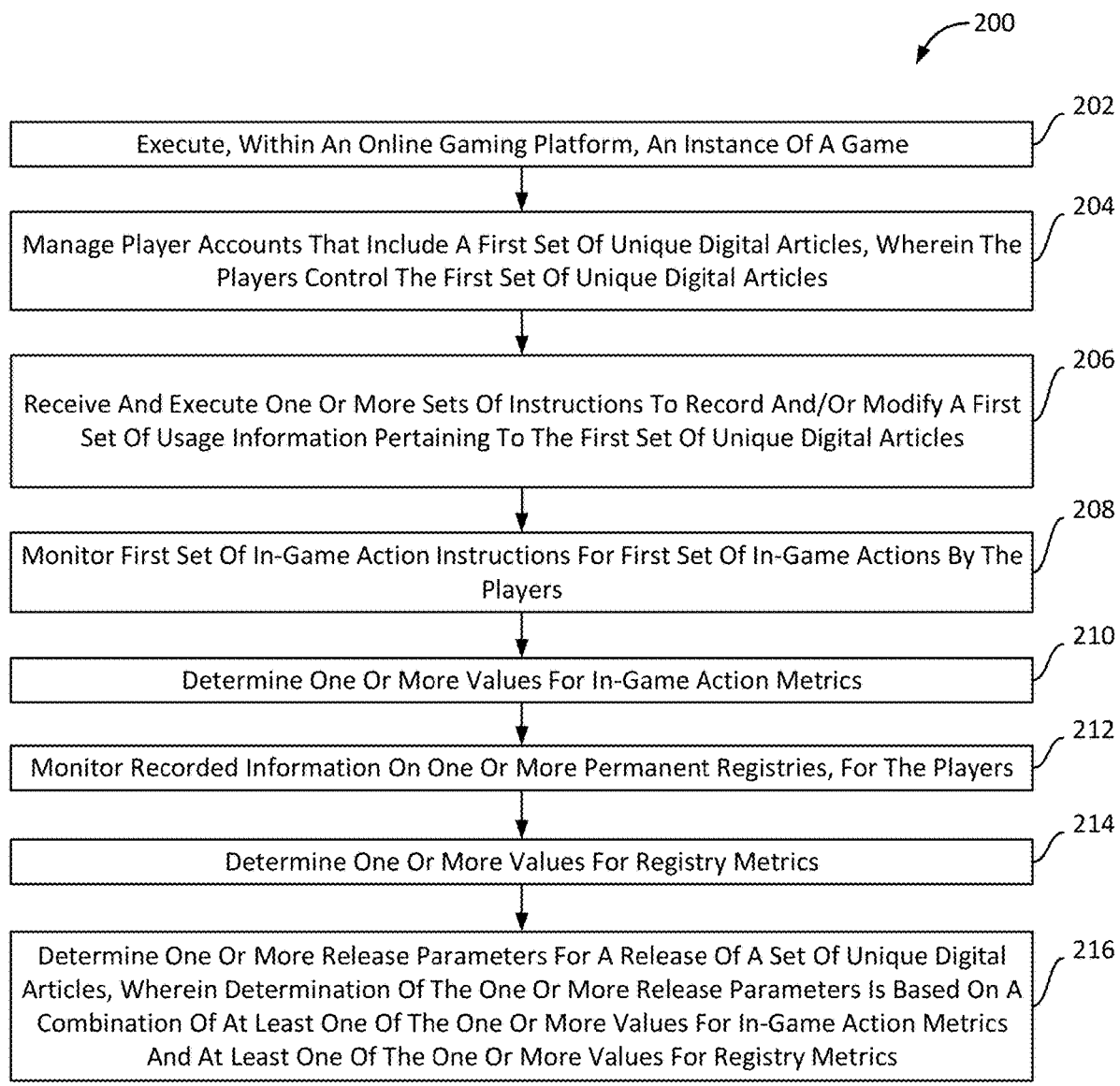
FIG. 2 illustrates a method of determining release logistics for releases of unique digital articles in an online gaming platform, in accordance with one or more implementations.

FIG. 2 illustrates a method 200 of combining permanent registry information and in-game activity information to determine release logistics, in accordance with one or more implementations. The operations of method 200 presented below are intended to be illustrative. In some implementations, method 200 may be accomplished with one or more additional operations not described, and/or without one or more of the operations discussed. Additionally, the order in which the operations of method 200 are illustrated in FIG. 2 and described below is not intended to be limiting.

In some implementations, method 200 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 200 in response to instructions stored electronically on an electronic storage medium. The one or more processing devices may include one or more devices configured through hardware, firmware, and/or software to be specifically designed for execution of one or more of the operations of method 200.

At an operation 202, an instance of a game is executed, within the online gaming platform, to facilitate presentation of the game to players, and in-game actions are implemented in the instance of the game in response to in-game action instructions for the in-game actions by the players. The presentation of the game is based on views of the game that are determined during execution of the instance of the game. In some embodiments, operation 202 is performed by a game component the same as or similar to game component 108 (shown in FIG. 1 and described herein).

At an operation 204, player accounts are managed that are associated with the players. The player accounts include player inventories that include a first set of unique digital articles. The players control the first set of unique digital articles that are associated with a first set of in-game user-controllable characters. In some embodiments, operation 204 is performed by an account component the same as or similar to account component 112 (shown in FIG. 1 and described herein).

At an operation 206, one or more sets of instructions are received and executed to record and/or modify a first set of usage information on a first permanent registry. The first set of usage information pertains to the first set of unique digital articles. In some embodiments, operation 206 is performed by a registry component and/or a recording component the same as or similar to registry component 128 and/or recording component 114 (shown in FIG. 1 and described herein).

At an operation 208, a first set of in-game action instructions for a first set of in-game actions by the players is monitored. In some embodiments, operation 208 is performed by a monitoring component the same as or similar to monitoring component 116 (shown in FIG. 1 and described herein).

At an operation 210, one or more values are determined for in-game action metrics based on the monitored first set of in-game action instructions. In some embodiments, operation 210 is performed by a monitoring component the same as or similar to monitoring component 116 (shown in FIG. 1 and described herein).

At an operation 212, recorded information is monitored, on one or more permanent registries, for the players. In some embodiments, operation 212 is performed by a monitoring component the same as or similar to monitoring component 116 (shown in FIG. 1 and described herein).

At an operation 214, one or more values for registry metrics are determined based on the monitored recorded information. In some embodiments, operation 214 is performed by a monitoring component and/or a registry-analysis component the same as or similar to monitoring component 116 and/or registry-analysis component 120 (shown in FIG. 1 and described herein).

At an operation 216, one or more release parameters is determined for the release of the set of unique digital articles. Determination of the one or more release parameters is based on a combination of at least one of the one or more values for in-game action metrics and at least one of the one or more values for registry metrics. In some embodiments, operation 216 is performed by a release component the same as or similar to release component 127 (shown in FIG. 1 and described herein).

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. It is to be understood that the present technology contemplates that, to the extent possible, one or more features of any implementation can be combined with features of any other implementation.

What is claimed is:

1. A system configured to determine release logistics for releases of unique digital articles in an online gaming platform, wherein a release of a set of unique digital articles includes availability of the set of unique digital articles to players of the online gaming platform through a store or marketplace, wherein the set of unique digital articles has not previously been available to the players through the store or the marketplace, the system comprising:
the online gaming platform including one or more hardware processors configured by machine-readable instructions to:
execute, within the online gaming platform, an instance of a game to facilitate presentation of the game to the players, and implement in-game actions in the instance of the game in response to in-game action instructions for the in-game actions by the players, wherein the presentation of the game is based on views of the game that are determined during execution of the instance of the game;
manage player accounts associated with the players, wherein the player accounts include player inventories that include a first set of unique digital articles, wherein the players control the first set of unique digital articles that are associated with a first set of in-game user-controllable characters; and
generate and transfer sets of instructions to record and/or modify a first set of usage information on one or more permanent registries, wherein the first set of usage information pertains to the first set of unique digital articles;
a registry server including one or more processors configured by one or more machine-readable instructions to:
implement at least one of the one or more permanent registries, including a first permanent registry; and
receive and execute one or more of the sets of instructions on the first permanent registry such that ownership of one or more unique digital articles in the first set of unique digital articles is recorded on the first permanent registry; and
wherein the one or more hardware processors included in the online gaming platform are further configured to:
monitor a first set of in-game action instructions for a first set of in-game actions by the players;
determine one or more values for in-game action metrics based on the monitored first set of in-game action instructions;
monitor recorded information, on the one or more permanent registries, for the players;
determine one or more values for registry metrics based on the monitored recorded information; and
determine one or more release parameters for the release of the set of unique digital articles, wherein determination of the one or more release parameters is based on a combination of at least one of the one or more values for in-game action metrics and at least one of the one or more values for registry metrics.

2. The system of claim 1, wherein the in-game action metrics include: (i) time spent logged into the online gaming platform for individual ones of the players.

3. The system of claim 2, wherein the in-game action metrics further include: (ii) time spent interacting within the instance of the game for individual ones of the players.

4. The system of claim 3, wherein the in-game action metrics further include: (iii) a number of times individual ones of the players have logged into the online gaming platform per a predetermined time frame, wherein the predetermined time frame is between 1 day and 60 days long.

5. The system of claim 4, wherein the in-game action metrics further include: an amount of consideration the first player has spent within the online gaming platform per a predetermined time frame, wherein the predetermined time frame is between 1 day and 60 days long.

6. The system of claim 1, wherein the one or more hardware processors included in the online gaming platform are further configured to:
control the release of the set of unique digital articles to the players in accordance with the determined one or more release parameters.

7. The system of claim 1, wherein the registry metrics include: (i) number of unique digital articles recorded as owned by individual ones of the players.

8. The system of claim 7, wherein the registry metrics further include: (ii) estimated value of the unique digital articles recorded as owned by individual ones of the players.

9. The system of claim 8, wherein the registry metrics further include: (iii) number of transactions involving the unique digital articles recorded as owned by individual ones of the players in which the individual ones of the players are sellers.

10. The system of claim 9, wherein the registry metrics further include: (iv) number of unique digital articles recorded on a public permanent registry as owned by individual ones of the players.

11. A method of determining release logistics for releases of unique digital articles in an online gaming platform, wherein a release of a set of unique digital articles includes availability of the set of unique digital articles to players of the online gaming platform through a store or marketplace, wherein the set of unique digital articles has not previously been available to the players through the store or the marketplace, the method comprising:

- executing, within the online gaming platform, an instance of a game to facilitate presentation of the game to the players, and implementing in-game actions in the instance of the game in response to in-game action instructions for the in-game actions by the players, wherein the presentation of the game is based on views of the game that are determined during execution of the instance of the game;
- managing player accounts associated with the players, wherein the player accounts include player inventories that include a first set of unique digital articles, wherein the players control the first set of unique digital articles that are associated with a first set of in-game user-controllable characters;
- receiving and executing one or ore sets of instructions on a first permanent registry to record and/or modify a first set of usage information, wherein the first set of usage information pertains to the first set of unique digital articles;
- monitoring a first set of in-game action instructions for a first set of in-game actions by the players;
- determining one or more values for in-game action metrics based on the monitored first set of in-game action instructions;
- monitoring recorded information, on one or ore permanent registries, for the players;
- determining one or more values for registry metrics based on the monitored recorded information; and
- determining one or more release parameters for the release of the set of unique digital articles, wherein determination of the one or more release parameters is based on a combination of at least one of the one or more values for in-game action metrics and at least one of the one or more values for registry metrics.

12. The method of claim 11, wherein the in-game action metrics include: (I) time spent logged into the online gaming platform for individual ones of the players.

13. The method of claim 12, wherein the in-game action metrics further include: (ii) time spent interacting within the instance of the game for individual ones of the players.

14. The method of claim 13, wherein the in-game action metrics further include: (iii) a number of times individual ones of the players have logged into the online gaming platform per a predetermined time frame, wherein the predetermined time frame is between 1 day and 60 days long.

15. The method of claim 14, wherein the in-game action metrics further include: (iv) an amount of consideration the first player has spent within the online gaming platform per a predetermined time frame, wherein the predetermined time frame is between 1 day and 60 days long.

16. The method of claim 11, further comprising:

- controlling the release of the set of unique digital articles to the players in accordance with the determined one or more release parameters.

17. The method of claim 11, wherein the registry metrics include: (i) number of unique digital articles recorded as owned by individual ones of the players.

18. The method of claim 17, wherein the registry metrics further include; (ii) estimated value of the unique digital articles recorded as owned by individual ones of the players.

19. The method of claim 18, wherein the registry metrics further include: (iii) number of transactions involving the unique digital articles recorded as owned by individual ones of the players in which the individual ones of the players are sellers.

20. The method of claim 19, wherein the registry metrics further include; (iv) number of unique digital articles recorded on a public permanent registry as owned by individual ones of the players.

\* \* \* \* \*

UNITED STATES PATENT AND TRADEMARK OFFICE
CERTIFICATE OF CORRECTION

| | | |
|---|---|---|
| PATENT NO. | : 11,896,908 B1 | |
| APPLICATION NO. | : 17/458176 | |
| DATED | : February 13, 2024 | |
| INVENTOR(S) | : Cameron Thacker | |

It is certified that error appears in the above-identified patent and that said Letters Patent is hereby corrected as shown below:

In the Claims

In Claim 5, Column 28, Line 45, please insert --(iv)--, between "include:" and "an", therefor.

In Claim 11, Column 29, Line 25, please delete "ore" and insert --more--, therefor.

In Claim 11, Column 29, Line 35, please delete "ore" and insert --more--, therefor.

Signed and Sealed this
Sixth Day of August, 2024

Katherine Kelly Vidal
*Director of the United States Patent and Trademark Office*